Patented May 25, 1943

2,320,234

UNITED STATES PATENT OFFICE 2,320,234

AROYL FORMHYDROXIMIC ACID HALIDES AND PROCESS OF MAKING THEM

Walter H. Hartung and Nathan Levin, Baltimore, Md., assignors to Sharp & Dohme, Incorporated, Philadelphia, Pa., a corporation of Maryland No Drawing. Application April 23, 1940, Serial No. 331,209

13 Claims. (Cl. 260—566)

This application relates to a method for the preparation of aroyl formhydroximic acid halides of the general formula

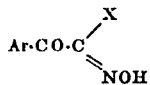

and to new products resulting from the method.

It has been possible to prepare the intermediate isonitrosoketones which upon subsequent reduction yield phenyl propanol amine and phenyl-substituted propanol amines and their higher alkyl homologues by allowing an alkyl nitrite to react in the presence of hydrogen chloride on the appropriate ketone in accordance with the reaction:

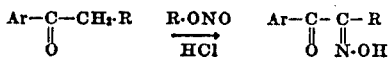

in which Ar is an aromatic radical and R is a methyl or a higher alkyl group.

However, it has been impossible or impracticable to apply the same reaction to acetophenone and its similarly nuclear substituted derivatives in the endeavor to obtain corresponding intermediate isonitrosoketones because of the fact that when acetophenone or one of its similarly nuclear substituted derivatives is substituted for the propyl or higher alkyl-aryl ketone as the starting material in the above reaction, the reaction will either not proceed at all or, if it does to any extent, it will give only negligible yields of the desired product.

It may be attempted to prepare iso-nitroso-acetophenone and its chloro- or methyl- nuclear substituted derivatives by reacting the corresponding initial ketone with an alkyl nitrite in the presence of a sodium alkoxide. However, the yields by such reaction are very low, being only around 25% and the reaction, furthermore, is restricted in its applicability, e. g., it cannot be used with the corresponding nuclear hydroxy substituted initial aryl-alkyl ketone.

From the general lability of the omega halogen, one would have expected that such halogen would be replaced readily by an oximino group. Therefore, we undertook to find out whether in the nitrosation of aracyl halides (i. e., aryl halogeno-methyl ketones) of the formula Ar·CO·CH₂X, such as phenacyl chloride and its nuclear-substituted derivatives, there would result the replacement of the halogen by the isonitroso group, in accordance with the reaction

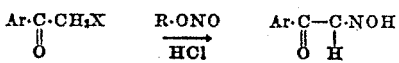

in which Ar is an aromatic radical and X is a halogen atom.

However, to our surprise, we found that during the nitrosation reaction, instead of the halogen's being replaced by the isonitroso group, actually the two methylene hydrogens were replaced by the isonitroso group and the halogen atom remained yielding the aroyl formhydroximic acid halide of the general formula

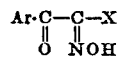

in which X is a halogen atom.

Therefore, this invention concerns the method of preparation of aroyl formhydroximic acid halides, which method comprises reacting an aryl halogeno-methyl ketone with an alkyl nitrite in the presence of a mineral acid such as hydrochloric acid. Quite briefly the method of the invention embraces replacing in one step the methylene hydrogen atoms of an aryl halogeno-methyl ketone by an oximino group.

In the aryl halogeno-methyl ketone starting material, the aryl radical may be substituted or unsubstituted, mono- or polynuclear, such as the penyl, naphthyl, anthryl, or other polynuclear aryl radical or substituted phenyl, naphthyl, anthryl, or other polynuclear aryl radical. The substituted aryl radical may contain at least one of any suitable substitutents such as other aryl radicals as the phenyl radical, or the nitro group, or halogens as chlorine, bromine, iodine, or fluorine, or the hydroxyl, alkoxyl, carbalkoxyl, carboxylic acid or sulfonic acid radicals, or an alkyl group as methyl, ethyl, propyl and the like, or any other suitable substituent or combinations thereof.

The halogen of the halogeno-methyl group of the initial ketone may be any halogen such as chlorine, bromine, iodine, or fluorine.

Thus any suitable aryl halogeno-methyl ketone may be employed as the starting material in the process of the invention, e. g., phenacyl halides or substituted phenacyl halides, as phenacyl chloride, phenacyl bromide, alkyl-phenacyl halides such as methyl phenacyl chlorides, hydroxyphenacyl halides including mono- and polyhydroxy phenacyl halides, for example, para-hydroxyphenacyl chloride, 3,4-dihydroxyphenacyl chloride, 3,4-dihydroxyphenacyl bromide, or arylphenacyl halides as paraphenylphenacyl chloride.

For the nitrosation, any suitable alkyl nitrite may be employed, such as methyl-, ethyl-, propyl-, butyl-, amyl-, and hexylnitrite and the like.

The process of the invention may be illustrated by but not restricted to, the following examples:

Example 1.—Benzoyl formhydroximic acid chloride

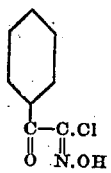

In a half-liter, three-neck, round-bottom flask provided with a reflux condenser, sealed mechanical stirrer, a dropping funnel and a gas-delivery tube which extends almost to the bottom of the flask, 15.5 gm. (0.1 mol) phenacyl chloride and 100 cc. ether (to which was added about 0.3 cc. water) were placed. The stirrer was set in motion and dry hydrogen chloride gas was passed into the reaction mixture at the rate of 2-3 bubbles per second. Then 12.6 cc. (0.11 mol) butyl nitrite is added by means of the dropping funnel in about 0.5-0.7 cc. portions, stirring and addition of hydrogen chloride being continued during this period. When all of the nitrite was in (required 30-40 minutes), stirring and addition of hydrogen chloride was continued for another 15 minutes, after which the mixture was allowed to stand for an additional 15 minutes. The ether was recovered by distillation from a hot water-bath and the residue dried in vacuo. The yellowish crystals obtained were recrystallized from boiling carbon tetrachloride. On cooling, long, white, needle-like crystals of benzoyl formhydroximic acid chloride separated; melting point 130–133° C.; yield 14.5–15.7 gm., representing 79–85.6% of the theoretical. A second recrystallization gave crystals melting at 132–133° C.

Example 2.—Benzoyl formhydroximic acid bromide 10 gm. (0.05 mol) phenacyl bromide was dissolved in 100 cc. of ether and hydrogen chloride and 5.8 cc. (0.055 mol) freshly distilled isopropyl nitrite were both added to the solution in the same type of apparatus and in the same manner as described in Example 1. After letting the reaction solution stand for several minutes and removing the solvent by distillation, the end product was isolated as long white crystals melting at 131–132° C.

Example 3.—Para-phenyl-benzoyl formhydroximic acid chloride

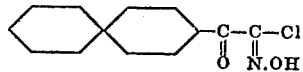

11.5 gm. (0.05 mol) of para-phenylphenacyl chloride and 200 cc. of ether were placed in an apparatus as described in Example 1, and hydrogen chloride and 5.4 cc. (0.052 mol) isopropyl nitrite were added, during constant stirring, in the manner described in Example 1. Complete solution of the paraphenylphenacyl chloride occurred when all of the nitrite had been added. After letting the reaction solution stand for thirty minutes, the solvent was removed by distillation, reduced pressure being applied toward the end. The yellow crystals obtained softened at 143 C., but after recrystallization from hot toluene, melted at 154°–156° C. Yield 78.3%.

Example 4.—3,4 dihydroxybenzoyl formhydroximic acid chloride

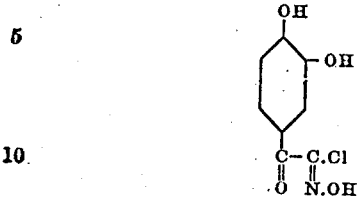

In a half-liter, three-neck, round-bottom flask provided with a mechanical stirrer, reflux condenser, delivery tube for hydrogen chloride and a dropping funnel, 14.9 gm. (0.08 mol) 3,4 dihydroxyphenacyl chloride were placed together with 200 cc. ether. The stirrer was set in motion. Complete solution did not occur at first, and hydrogen chloride was introduced at the rate of 1-2 bubbles per second and was continued, with constant stirring, during the subsequent addition of 7.5 cc. (0.08 mol) isopropyl nitrite (in three separate portions) in 0.5 amounts over a period of about forty minutes. After the addition of the first portion, the mixture slowly became a pale red-brown, after which a second portion was added; the color was intensified, whereupon the third portion was added. The mixture gradually warmed up, and the ether refluxed gently; the ketone gradually dissolved, and when all the nitrite was in, complete solution occurred. Stirring and bubbling of hydrogen chloride were continued for another ten minutes, at the end of which time the solution assumed a dark-red color. Then the reaction flask was immersed in a bath of warm water, maintained at 45-50°; the reflux condenser was inverted for downward distillation, and after the evaporation of the ether, the yield of yellow crystals obtained was 17.0 gm., which, after two recrystallizations from ether-benzene mixture, were pale yellow. The latter crystals began to sinter at about 173° C., and melted with decomposition at 184–185° C. Yield about 80%.

In a maner similar to that shown in the above examples, by employing other aryl halogenomethyl ketones as the starting material other corresponding aroyl formhydroximic acid halides are obtained, for example, the formhydroximic acid chloride when a chloro ketone is the starting material, the formhydroximic acid bromide when a bromo ketone is the starting material, and so on. Thus, for example, there has been obtained para-chlorbenzoyl formhydroximic acid chloride, melting at 119–120.5° C., in a 72% yield, and para-methylbenzoyl formhydroximic acid chloride, melting at 126–128° C., in 72% yield.

The reaction of the invention proceeds smoothly resulting in good yields, as indicated by the specific examples. In spite of their chemical nature, the end products from the reaction are very stable and may be handled with safety.

The products of the invention are useful in applications of acid halides, such as acid chlorides and also otherwise as intermediates for the preparation of other substances having pharmaceutical activity, for example, as intermediates for the preparation of phenyl ethanol amines, in which the phenyl group is either unsubstituted or substituted and particularly for the preparation of those in which the phenyl group is substituted.

We claim:

1. The method of preparation of aroyl formhydroximic acid halides, which comprises reacting under acid conditions an aryl halogeno-methyl ketone with an alkyl nitrite.

2. The method of preparation of aroyl formhydroximic acid halides, which comprises reacting an aryl halogeno-methyl ketone with an alkyl nitrite in the presence of a mineral acid.

3. The method of preparation of aroyl formhydroximic acid halides, which comprises reacting an aryl halogeno-methyl ketone with an alkyl nitrite in the presence of hydrogen chloride.

4. The method of preparation of hydroxy-benzoyl formhydroximic acid halides, which comprises reacting a phenacyl halide hydroxy substituted on the ring with an alkyl nitrite in the presence of hydrogen chloride.

5. The method of preparation of polyhydroxybenzoyl formhydroximic acid halides, which comprises reacting a phenacyl halide polyhydroxy substituted on the ring with an alkyl nitrite in the presence of hydrogen chloride.

6. The method of preparation of dihydroxybenzoyl formhydroximic acid halides, which comprises reacting a phenacyl halide dihydroxy substituted on the ring with an alkyl nitrite in the presence of hydrogen chloride.

7. The method of preparation of 3,4 dihydroxybenzoyl formhydroximic acid halides, which comprises reacting a 3,4 dihydroxylphenacyl halide with an alkyl nitrite in the presence of hydrogen chloride.

8. The method of preparation of 3,4 dihydroxybenzoyl formhydroximic acid chloride, which comprises reacting a 3,4 dihydroxylphenacyl chloride with an alkyl nitrite in the presence of hydrogen chloride.

9. Aroyl formhydroximic acid halides in which the aryl radical is selected from the hydroxyphenyl radicals.

10. Dihydroxy-benzoyl formhydroximic acid halides.

11. 3,4 dihydroxy-benzoyl formhydroximic acid halides.

12. 3,4 dihydroxy-benzoyl formhydroximic acid chloride.

13. In the preparation of aroyl formhydroximic acid halides, the step which comprises treating an arylacetyl halide with an alkyl of nitrous acid whereby the methylene hydrogens of the acetyl portion of the arylacetyl halide are replaced by an isonitroso group.

WALTER H. HARTUNG.
NATHAN LEVIN.

CERTIFICATE OF CORRECTION.

Patent No. 2,320,234. May 25, 1943.

WALTER H. HARTUNG, ET AL.

It is hereby certified that error appears in the printed specification of the above numbered patent requiring correction as follows. Page 1, first column, lines 27 and 28, for "propyl or" read --propyl- or--; and second column, line 26, for "penyl" read --phenyl--; page 3, second column, line 21, claim 13, after "alkyl" insert --ester--; and that the said Letters Patent should be read with this correction therein that the same may conform to the record of the case in the Patent Office.

Signed and sealed this 16th day of November, A. D. 1943.

(Seal)

Henry Van Arsdale,
Acting Commissioner of Patents.